United States Patent [19]

Audeh et al.

[11] 4,354,928

[45] Oct. 19, 1982

[54] SUPERCRITICAL SELECTIVE EXTRACTION OF HYDROCARBONS FROM ASPHALTIC PETROLEUM OILS

[75] Inventors: Costandi A. Audeh, Princeton, N.J.; Tsoung Y. Yan, Philadelphia, Pa.

[73] Assignee: Mobil Oil Corporation, New York, N.Y.

[21] Appl. No.: 157,728

[22] Filed: Jun. 9, 1980

[51] Int. Cl.³ .............................................. C10C 3/00
[52] U.S. Cl. ................................... 208/309; 208/311
[58] Field of Search ................ 208/45, 309, 311, 86, 208/3

[56] References Cited

U.S. PATENT DOCUMENTS

| | | | |
|---|---|---|---|
| 2,940,920 | 6/1960 | Garwin | 208/45 |
| 2,980,602 | 4/1961 | Garwin | 208/309 |
| 3,321,394 | 5/1967 | Mills | 208/45 |
| 3,507,777 | 4/1970 | Hemminger | 208/309 |
| 3,511,774 | 5/1970 | Long | 208/86 |
| 3,607,716 | 9/1971 | Roach | 208/10 |
| 3,723,294 | 3/1973 | Gatsis | 208/309 |
| 3,798,157 | 3/1974 | Manzanilla | 208/309 |
| 4,082,695 | 4/1978 | Rosinski | 252/465 |
| 4,211,633 | 7/1980 | Gleim | 208/309 |
| 4,239,216 | 12/1980 | Gearhart | 208/45 |

*Primary Examiner*—Brian E. Hearn
*Attorney, Agent, or Firm*—Charles C. Huggett; Michael G. Gilman; Van D. Harrison, Jr.

[57] ABSTRACT

An asphalt containing petroleum oil is deasphalted and extracted by contacting the oil with a solvent maintained at its critical temperature and pressure. With the solvent at its critical temperature and pressure, extraction of the valuable hydrocarbon oils present in the asphaltic feedstock is effected by way of vapor-liquid phase separation which serves to decompose the metal complexes present in the feedstock, thus reducing the metal content of the extracted hydrocarbon oil. Examples of solvents employed in the process of the invention include $C_4$-$C_{10}$ cuts of typical refinery streams, benzene, toluene, ethylene glycols and the like. In one process embodiment, promoters or catalyst are employed to further reduce the metal content of the extracted hydrocarbon oil.

3 Claims, 2 Drawing Figures

SUPERCRITICAL SELECTIVE EXTRACTION OF HYDROCARBONS FROM ASPHALTIC PETROLEUM OILS

BACKGROUND OF THE INVENTION

1. Field of the Invention

The present invention relates to the recovery of hydrocarbon oils from petroleum residue and, more particularly, to an improved process for selectively extracting heavy hydrocarbons from asphalt-containing petroliferous oils.

2. Brief Description of the Prior Art

As known in the art, crude oils are conventionally subjected to atmospheric distillation to remove light materials such as gas oils, kerosenes, gasolines, lighter petroleum hydrocarbons and the like. The residue from this atmospheric distillation is then typically subjected to vacuum distillation to produce a vacuum gas-oil type distillate and a vacuum reduced residuum which contains asphalt, resins and heavy hydrocarbon oil components. The recovery of the latter, i.e., the heavy hydrocarbon oils and their upgrading, has become particularly significant in view of the acute shortages and high cost of whole crudes.

In this regard, in recent years considerable effort has been expended to develop improved techniques or processes for recovering the aforesaid hydrocarbon oils from asphaltic petroleum residua. To a considerable extent known processes involve extraction of the oil with a deasphalting solvent, as e.g., propane, and thereafter separating and recovering the oil components from the solvent. Thus in U.S. Pat. No. 2,950,244, there is disclosed a process for the extraction of petroleum residue wherein the asphalt containing feedstock is contacted with a liquified normally gaseous solvent, i.e., propane, which is maintained at a temperature of from between 100° to 250° F. and at a pressure sufficient to maintain the solvent in the liquid phase.

While propane is conventionally employed in such known deasphalting operations, further solvents have been proposed. In U.S. Pat. No. 4,054,512, an asphalt-containing mineral oil is deasphalted by contacting the oil with liquid hydrogen sulfide. The use of the liquid neopentane, maintained at a temperature of from about 0° to 250° F., as the deasphalting solvent is disclosed in U.S. Pat. No. 3,334,043. In U.S. Pat. No. 2,337,448, a heavy residuum is deasphalted by contacting the feedstock with a solvent such as ethane, ethylene, propane, propylene, butane, butylene, isobutane and mixtures thereof.

Multi-stage solvent extraction techniques involving the use of one or more solvents are also known. Thus in U.S. Pat. No. 3,658,695 there is disclosed a liquid solvent extracting process involving the use of two or more extraction zones. In this process, the deasphalted oil and solvent, recovered from the first extraction zone, is subjected to the addition of a further solvent in a second zone, the latter being maintained at a higher or increased temperature. U.S. Pat. No. 4,017,383 discloses a further multi-stage deasphalting process with the basic concept in this technique involving the recovery of the solvent from the extracted hydrocarbons in a series of two or more pressure stages. The solvents employed in this process comprise liquified low molecular weight hydrocarbons such as propane and isobutane.

While many such proposals are known and have achieved, at least to some extent, commercial significance, in general they suffer from a number of known disadvantages including the plugging of the equipment by the asphalt-resin fraction, low yields of the deasphalted heavy hydrocarbon oil, complex multi-stage operating procedures and the like. The present invention is directed to an advance and improvement over such prior known techniques.

SUMMARY OF THE INVENTION

In summary, the present invention relates to the deasphalting of petroleum residual feedstocks by the selective extraction of the hydrocarbons with low molecular weight organic solvents. In its broadest aspects, the invention involves the use of a solvent or a mixture of solvents having a critical temperature in excess of about 200° C. and which, during the extraction process, is maintained at or above its critical temperature and critical pressure so as to effect extraction and recovery of the hydrocarbon oil from the feedstock by way of vapor-liquid phase separation. Upon separation of the heavy hydrocarbons from the asphaltic phase of the residue, the solvent, containing the extracted hydrocarbon oil, is subjected to fractionation to separate and recover the solvent and oil. The light boiling solvent is recycled to the extraction unit with the heavy hydrocarbon oils then being further processed in accordance with known techniques as, e.g., by catalytic cracking, hydrodesulfurization, or the like.

In the practice of the invention, the metal complexes present in the feedstock are separated from the heavy oils, with which they form aggregates, allowing the soluble oil to leave with the solvent and the insoluble complexes to remain in the asphaltic residue. Thus oil of low metal and asphaltene contents is obtained in high yield.

In accordance with a particularly advantageous process embodiment of the invention, catalyst and/or promoters are introduced into the extraction unit so as to further reduce the metal and/or sulfur content of the solvent/hydrocarbon oil mixture. The effect of such promoters may be further enhanced by the design of the extraction unit. Preferred solvents for use in the process of the invention include $C_4$-$C_{10}$ cuts of typical refinery streams as, e.g. light/heavy naphthas, catalytic cracked gasolines, coker gasolines, kerosines, light FCC cycle oil and the like. The use of the super critical solvent in the selective removal of the hydrocarbons in accordance with the invention provides improved yields, control of the metal and/or sulfur content present in the recovered hydrocarbons and further significant and improved operation due to enhanced phase separation.

It is accordingly a general object of the present invention to provide a novel process for deasphalting heavy petroleum residuals.

A further and more particular object is to provide a process for the treatment of crude oil residuals to recover a hydrocarbon oil which is essentially asphalt-free and which has a reduced metal contaminant content.

A further object is to provide a highly efficient process for recovering hydrocarbon oils from asphalt containing petroleum residua.

A further object is to provide a process for deasphalting the residual oils by the use of a selective low molecular weight organic solvent or a mixture thereof maintained at or above its critical temperature and pressure.

The manner in which the foregoing and further objects are achieved in accordance with the present invention will be better understood in view of the following detailed description and accompanying drawing, which forms a part of this specification and wherein.

DESCRIPTION OF PREFERRED EMBODIMENTS

Figure 2:
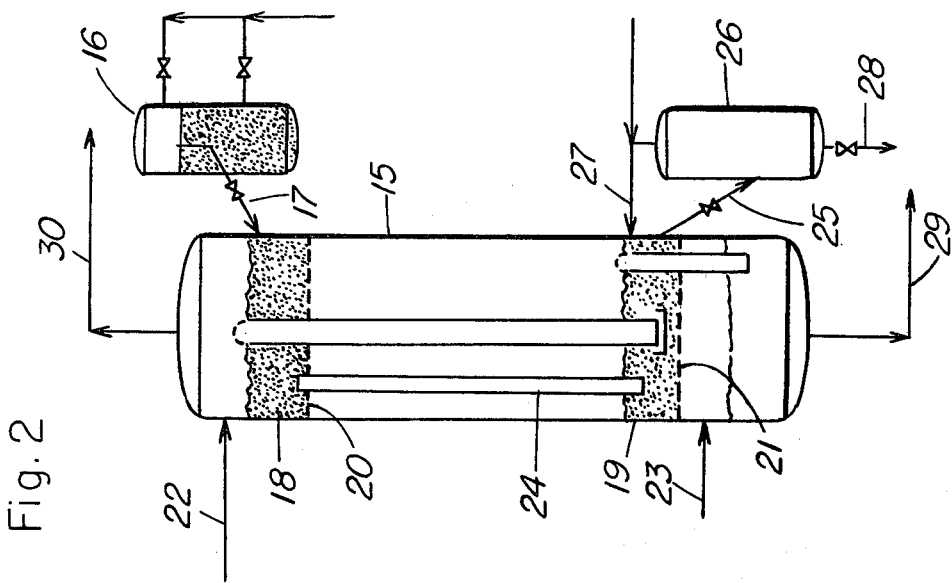
FIG. 2 is a flow diagram schematically illustrating a particularly suitable arrangement of apparatus for carrying out a second process embodiment of the invention.

As briefly noted above, the present invention relates to a process for recovering hydrocarbon oils from heavy asphaltene containing petroleum fractions or feedstocks by the use of a solvent which is maintained at or above its critical temperature and critical pressure during the extraction process. In this manner the recovery of the hydrocarbons from the residua is effected by way of vapor-liquid phase separation which serves to breakdown the aggregates of asphaltenes which contain heavy oils and metal complexes present in the residua itself. The extract, which is defined herein as that fraction containing the solvent/hydrocarbon oil mixture, is then fractionated to recover both the heavy hydrocarbon oil and solvent. In accordance with the further process embodiment of the invention, promoters and/or catalyst are added during the extraction to further alter the metal complexes and asphaltenes so as to decompose them, form soluble oils and thus further improve the yield of the hydrocarbon oil product.

Suitable solvents that may be employed in the present invention comprises low molecular weight organic solvents having critical temperatures of above about 200° C. Particularly advantageous and preferred solvents include $C_4$-$C_{10}$ cuts of refinery streams as, e.g., naphthas, light/heavy catalytic cracker gasoline, coker gasolines, light/heavy reformates and kerosines. FCC cycle oil is a particularly preferred solvent inasmuch as this refinery product could be made to include small quantities of catalyst fines, acidic clays, alkali carbonates, etc., which as otherwise disclosed herein, serve to cause the asphaltene aggregates to be dissociated from the smaller units which are volatile enough to be distilled after they are recovered as oils in the overhead product or extract. Further solvents include ethyl benzene or mixtures thereof, ethylene glycols, thiophenes or their derivatives, benzene, toluene, pentane, methanol and the like. In general, the amount of solvent used in the extraction process should be controlled so as to obtain a deasphalted extracted hydrocarbon oil of the desired viscosity, aromatic content, etc. The amount of the solvent used will typically comprise from about 100 to 600 LV% of the feedstock with preferred and particularly advantageous results being obtained when the solvent comprises from about 200 to 400 LV% of the feedstock.

In the practice of the invention, the solvent extraction is conducted at a temperature in excess of about 250° C. and at, or above, the critical temperature and critical pressure of the particular solvent employed so as to effect extraction of the hydrocarbons from the feedstock by way of vapor-liquid phase separation. With the powerful solvent at or slightly above its critical temperature, the asphaltenes aggregates are dissociated into smaller oil units and the oil is recovered in the solvent/oil phase. This is in contrast to the prior art wherein the residue is contacted with a liquid solvent at a temperature below the critical temperature of the solvent. Under these conditions, the liquid solvent has a limited ability to dissolve the hydrocarbons in the residue and has no ability to change the nature of the high molecular weight asphaltene aggregates present in the residue.

As should be apparent to those skilled in the art, the process of the invention may be used to simultaneously deasphalt-extract any hydrocarbon oil feedstock containing both asphaltene and oil components. Suitable feedstocks are crude oils, including crudes recovered from tar sands, atmospheric and vacuum residua having initial boiling points ranging from about 500° to about 1100° F. (atmospheric pressure), etc. Both atmospheric residuum, boiling above about 700° F., and vacuum residuum, boiling above about 1000° F. can be treated by the process of the invention. Such feeds may comprise Arabian light or heavy crudes, Kuwait crudes, etc.

The contacting of the feedstock with the solvent may be carried out in one or more settler units, in one or more extraction towers or the like. If a column or extractor tower is employed the feedstock would preferably enter or be charged to the tower at a point above that of the introduction of the light hydrocarbon solvent. The tower may be provided with internal means such as contacting trays, packing, rotating discs, contactors, etc., to provide sufficient contacting of the solvent and feed. The asphaltic phase preferably passes through the tower countercurrently to the rising stream of the solvent and is withdrawn from the bottom. The extract phase containing the deasphalted oil/solvent mixture passes upward through the tower countercurrently to the bulk and is removed at the top of the tower.

Figure 1:
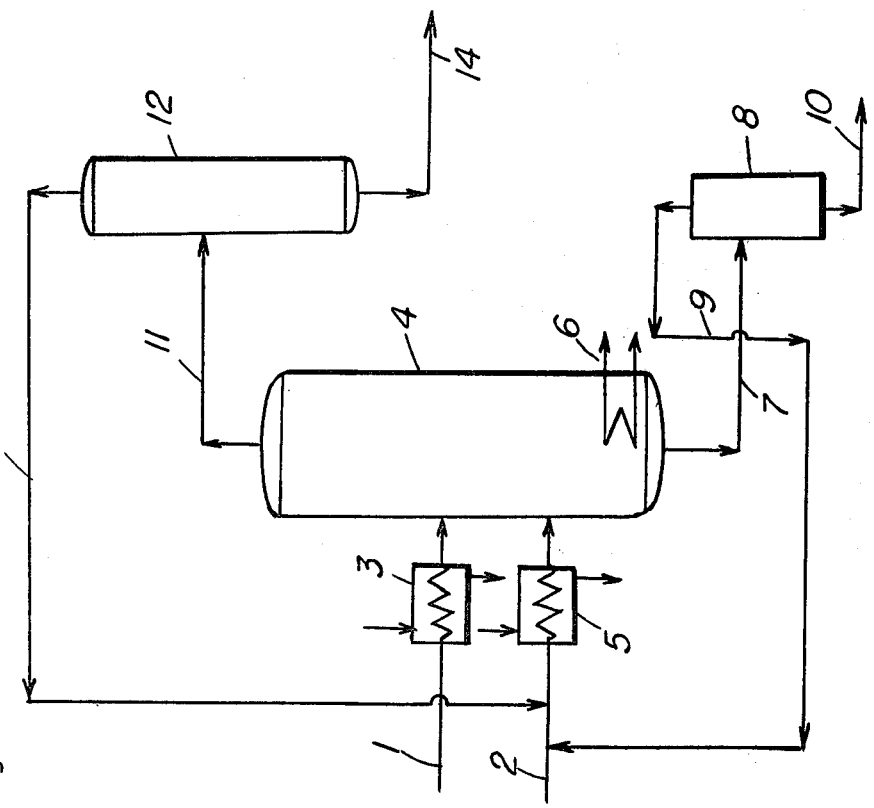
FIG. 1 is a flow diagram schematically illustrating a particularly advantageous process embodiment of the invention.

Turning now to the drawings and with reference first to FIG. 1, the asphaltic feedstock is introduced continously or batchwise by way of conduit 1 into an extraction zone, indicated at 4. The organic solvent is introduced, via conduit 2, into the reactor preferably, as previously noted, at a point below that of the feedstock. The feedstock and solvent may be premixed in a suitable vessel (not shown) and/or may be preheated by way of heat exchangers 3 and 5, respectively, prior to their introduction into the extraction zone 4. Suitable heat exchange means, indicated at 6, may also be provided or positioned within the reactor 4 itself as shown. In any event, the temperature of the solvent must be maintained at or slightly above its critical temperature and critical pressure. In the extractor zone, the heavy phase, containing the partially dissolved asphaltic particulates and resins, settles and is removed through conduit 7 to solvent stripper 8 wherein solvent is removed as overhead through line 9 and recycled to conduit 2 for introduction into extraction zone 4. Heavy material is removed from stripper 8 via conduit 10. The lighter phase, which contains the solvent and extracted hydrocarbon oil, is withdrawn and recovered as an overhead product and is charged, via conduit 11, into a distillation or like fractionation unit indicated at 12. In the distillation column the low molecular weight solvent is flashed off, withdrawn as a gas, and recycled to the extractor via conduit 13. The heavy hydrocarbon oil, which is low in metal content, is removed and recovered by way of conduit 14 and then forwarded for further processing such as by catalytic cracking, hydrodesulfurization or the like, the latter being of course well known in the art.

In accordance with a further process embodiment, promoters or catalyst are added to the extractor to further effect, in combination with the vapor-liquid phase separation, dissociation of the asphaltene aggregates into smaller units and additionally to reduce the metal and/or sulfur content of the extracted oil. The metal complexes, as well as the asphaltenes, are decomposed. The metal content of the overhead extracted oil is thus reduced since much of the metal gets into the overhead fractions of conventional high temperature and high vacuum distillation as volatile porphyrin. While known extraction apparatus may be employed for carrying out this embodiment, the effect of the promoters and/or catalyst may be enhanced by the design of the extractor equipment. For example, the relative size or length of the bottom section, where the residue accumulates, can be increased to increase the residence time of the promoters.

In this regard, the promoters may be premixed with the asphalt containing feedstock or introduced directly into the extraction zone itself. As an alternative, and with reference now to FIG. 2, the solid catalytic particulates may be caused to move from stage to stage in an extractor, indicated generally at 15, concurrently with either the heavy phase containing the asphaltic particles or with the lighter solvent/extracted oil phase. In the design illustrated in FIG. 2, the solid particulates are introduced into the reactor 15 from a supply tank 16 through line 17. The extractor may include a series of superimposed beds (only upper and lower beds 18 and 19 being shown) each bed being supported upon perforated plates indicated generally at 20 and 21. The feedstock would be introduced into the extractor 15 via conduit 22 with the solvent being introduced at a point below that of the feedstock as through conduit 23. The solid catalytic particles would flow from one stage to the next through suitable means such as solids transfer tubes 24. The spent catalyst is withdrawn from the lowermost bed through conduit 25 to a vessel 26. Liquid separated from the solids in this vessel is returned to the extractor through conduit 27. The spent solids are removed through conduit 28. In the embodiment of FIG. 2, the catalytic solid phase is caused to pass downwardly through extractor. However, and as known in the art, the solid phase may be caused to pass upwardly through the extractor concurrently with solvent/extracted oil phase and countercurrent to the heavy asphaltic phase. In either case, and again as known, the suspension of the solid particulates as well as their rate of flow through the reactor is controlled by the adjustment of the relative flow rates of the heavy and light phases, the liquid level in each bed, etc. The heavy asphalt phase is withdrawn from the extractor 15 through conduit 29 with the solvent/hydrocarbon oil phase being withdrawn via conduit 30 and further processed in the manner as discussed hereinabove.

The catalyst and/or promoters employed in this embodiment may comprise known demetalization catalyst such as disclosed, e.g., in U.S. Pat. Nos. 4,054,508 and 4,082,695, these patents being deemed to be incorporated herein by reference. Although the catalysts disclosed by these references are particularly effective for use herein, it should be appreciated that further known demetalization/hydrodesulfurization catalysts may be employed. Specific examples of the latter are disclosed in U.S. Pat. Nos. 4,049,542; 3,464,915; 4,089,774 and 3,904,513. An example of a particularly advantageous promoter comprises that certain class of synthetic siliceous crystalline materials known and designated in the art as "zeolite ZSM-5" or simply "ZSM-5". These crystalline zeolites are disclosed in U.S. Pat. No. 3,702,886 which is also deemed to be incorporated herein by reference. As noted above, the feedstock itself may in fact contain catalytic fines present in the feedstock as the result of prior processing. An example of such a feedstock would be the bottoms or residue of a FCC column. Since such materials would include small quantities of the catalyst, acidic clays or the like, little or no additional catalyst would be required.

The following examples will serve to further illustrate the present invention but are expressly intended not to limit it thereto.

EXAMPLE 1

In this example a pilot plant run is carried out on a vacuum reduced residuum, obtained by the vacuum distillation of an atmospheric residua, and having an initial boiling point of 1100° F. (atmospheric pressure) and comprising 2.0% by weight sulfur, 28 ppm Ni and 220 ppm V. The feedstock is introduced into the middle portion of an extraction column with a catalytic cracker gasoline being introduced near the bottom of the column as the solvent. The operating conditions in the extraction column are maintained at the critical temperature and pressure are 725° F. and 650 psig, respectively. An asphaltic heavy phase and a deasphalted oil/solvent extract phase are formed, with the extract being removed from the top of the column and the heavy asphaltic phase being removed from the bottom. The solvent is removed from the extract phase by subjecting the oil/solvent mixture to flash distillation (under a vacuum of 20" Hg) with the solvent being removed as a vapor and being recycled to the extraction column. In this example, the ratio of the solvent to the feed is 200 LV%. The results of this test are shown in Table 1 set forth hereinbelow.

EXAMPLE 2

The above procedure is repeated except that propane at 175° F. is substituted for the solvent employed in Example 1. In this example, the operating temperature and pressure are maintained so that the propane is maintained in liquified form. The results of this test are also shown in Table 1.

TABLE 1

|  | Example 1 | Example 2 |
| --- | --- | --- |
| Solvent | Catalytic Cracker Gasoline | Propane |
| Solvent/oil Ratio (LV %) | 200 | 600 |
| Temperature, °F. | 725 | 175 |
| Pressure, psig | 650 | 500 |
| Deasphalted Oil |  |  |
| Yield, wt % | 75 | 68 |
| Ni/V, wppm | 2/12 | 3/22 |
| Asphalt |  |  |
| Yield, wt % | 26 | 31 |

The data of Table 1 show that the solvent extraction process of the invention provides deasphalted oil yields that are higher than those resulting from the use of liquid propane. The metal content of the deasphalted oil is also significantly reduced.

EXAMPLE 3

In a series of further tests, the procedure of Example 1 is repeated except that varying solvents are substituted for the cracker gasoline solvent used in Example 1. These solvents include refinery cuts of light naphtha and coker gasoline, benzene, ethylene glycol, toluene and pentane. The results are substantially the same as that of Example 1 and again established that the process of the invention provides increased yields and a higher quality deasphalted oil as compared to prior art processes.

EXAMPLE 4

The procedure of Example 1 is repeated except that the solvent comprised FCC cycle stock. This feedstock contained small quantities of catalyst fines, acidic clays and alkali carbonates. The results of this Example are shown in Table 2.

TABLE 2

|  | Example 4 |
| --- | --- |
| Solvent | FCC Cycle Stock |
| Solvent/oil ratio (LV %) | 200 |
| Temperature, °F. | 755 |
| Pressure, psig | 670 |
| Deasphalted Oil | |
| Yield, wt % | 79 |
| Ni/V, wppm | 2/10 |
| Asphalt | |
| Yield, wt % | 21 |

EXAMPLE 5

The procedure of Example 1 is repeated except that a heavy hydrocarbon oil comprising a Kuwait Atmospheric Residua having 3.54% by weight sulfur, 12 ppm Ni and 42 ppm V and a 50% point of about 850° F. was substituted for the vacuum residuum feedstock employed in Example 1. The results of this test are substantially the same as those of Example 1 and establish that the process of the invention may be used to deasphalt an atmospheric residuum as well as a vacuum resid.

EXAMPLE 6

In this experiment the procedure of Example 1 is repeated except that a demetalization catalyst comprising a mixture of cobalt and molybdenum deposited on an alumina base having greater than 5% of its pores of a diameter greater than 500 A and prepared in accordance with the teachings of U.S. Pat. No. 4,082,695 was charged to the upper portion of the extraction column. The apparatus employed was substantially the same as that shown in FIG. 2 with the catalyst flowing countercurrently to the direction of the solvent and being withdrawn near the top of the extraction column. The results of this Example are shown in Table 3.

TABLE 3

| Solvent | Catalytic cracker gasoline |
| --- | --- |
| Solvent/oil ratio (LV %) | 200 |
| Temperature, °F. | 725 |
| Pressure, psig | 650 |
| Deasphalted Oil | |
| Yield, wt % | 81 |

TABLE 3-continued

| Ni/V, wppm | 1/10 |
| --- | --- |
| Asphalt | |
| Yield, wt % | 19 |

The above examples and corresponding tables strikingly illustrate the effectiveness of the unique process of the invention both from its unique ability in deasphalting asphaltic feedstocks as well as in increasing the yield of the recovered oil and reducing its metal content. Thus, and as will be appreciated by those skilled in the art, the use or application of the supercritical solvents in the selective extraction of hydrocarbons from asphaltic residua is indeed unique. For example, whereas, in a vacuum tower, distillation and fractionation stop because of the excessive presence of asphaltic materials in the residue, in the process of the instant invention the heavy hydrocarbon oils are removed from the asphaltic residue and are further, in effect, distilled and fractionated.

What is claimed is:

1. A process for extracting a hydrocarbon oil from an asphaltic feedstock, said process comprising the steps of contacting said feedstock with a low molecular weight organic solvent selected from the group consisting of ethylene glycols and thiophenes at a temperature and pressure equal to, or slightly greater than the critical temperature and critical pressure of said solvent so as to effect separation of said hydrocarbon oil from said feedstock by way of vapor-liquid phase separation and to form two immiscible phases comprising a heavy asphalt phase and a solvent phase containing said hydrocarbon oil, said hydrocarbon oil being substantially free of said asphalt and having a reduced metal content; separating said two immiscible phases and recovering said hydrocarbon oil from said solvent phase.

2. A process for extracting a hydrocarbon oil from an asphaltic feedstock, said process comprising the steps of contacting said feedstock with a low molecular weight organic solvent selected from the group consisting of naphthas, catalytically cracked gasolines, coker gasoline, FCC cycle oil, ethylene glycols and thiophenes, in the presence of a catalyst comprising a Group VI or Group VIII metal, or mixtures thereof, on an alumina support, at a temperature and pressure equal to, or slightly greater than the critical temperature and critical presure of said solvent so as to effect separation of said hydrocarbon oil from said feedstock by way of vapor-liquid phase separation and to form two immiscible phases comprising a heavy asphalt phase and a solvent phase containing said hydrocarbon oil, said hydrocarbon oil being substantially free of said asphalt and having a reduced metal content; separating said two immiscible phases and recovering said hydrocarbon oil from said solvent phase.

3. The process in accordance with claim 2 wherein said catalyst comprises a cobalt-molybdenum composite on an alumina base, said alumina base having at least 5% of its pore volume in pores having a diameter greater than about 500 A.

* * * * *